Feb. 2, 1965

O. S. McJOHNSON 3,168,113

MIXING VALVE

Filed Dec. 21, 1962

4 Sheets-Sheet 1

INVENTOR.
OTIS S. McJOHNSON
BY
Victor J. Evans &Co.
attorneys

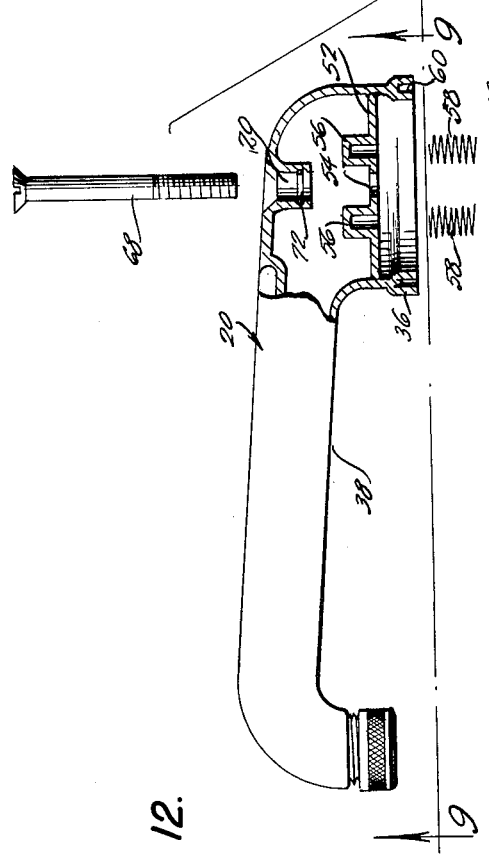

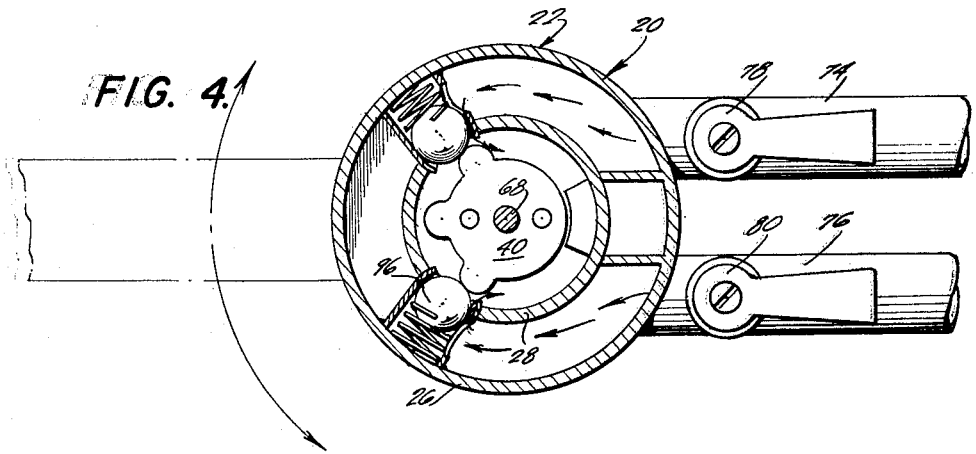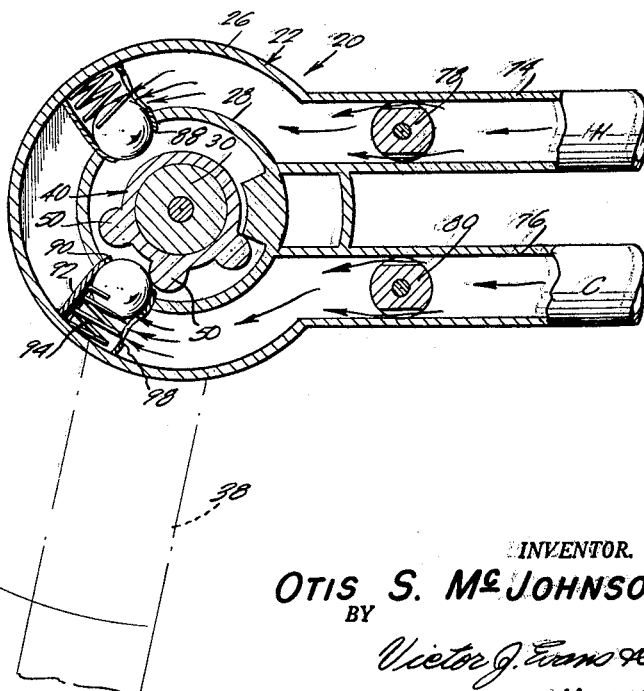

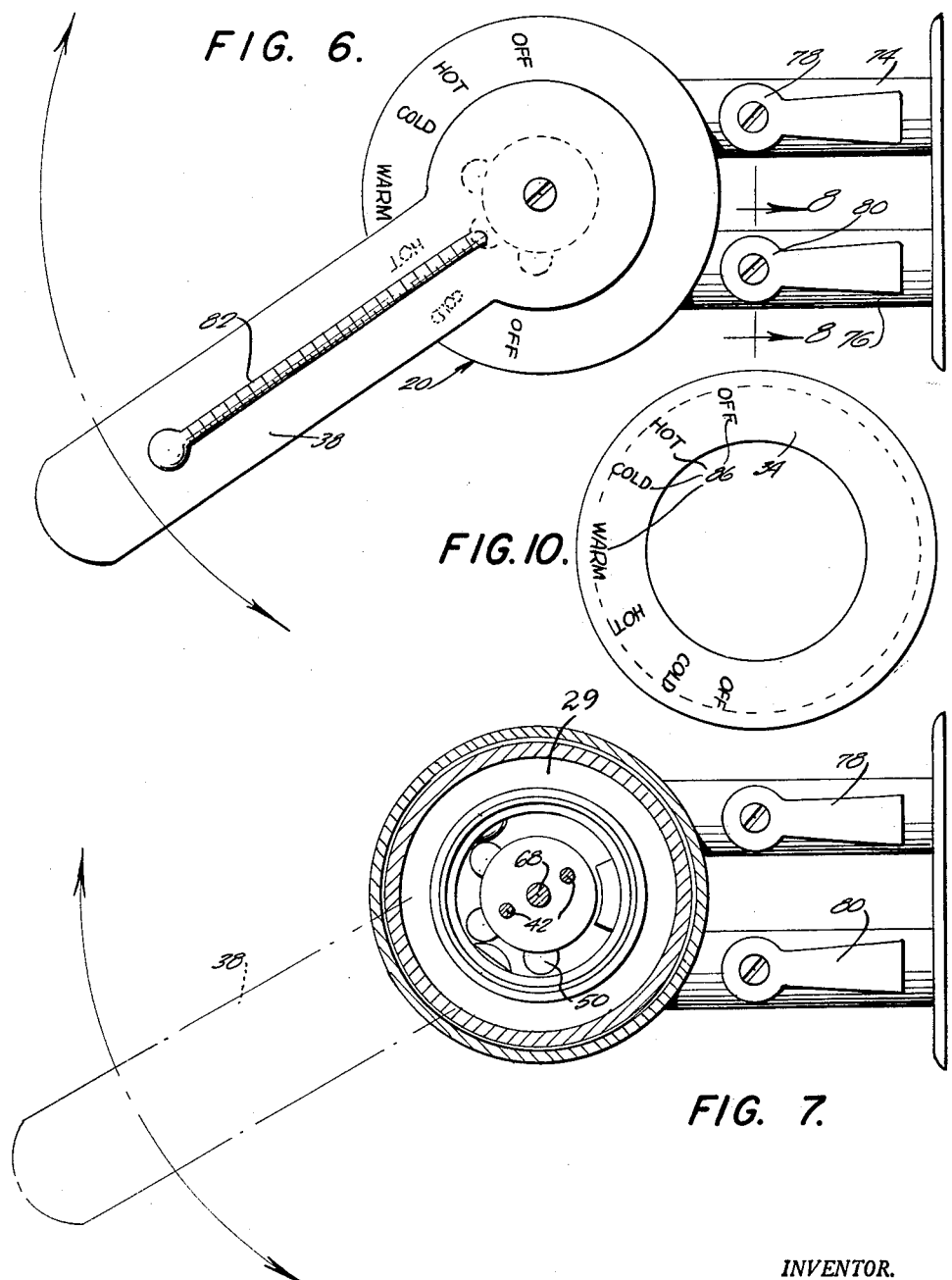

3,168,113
MIXING VALVE
Otis S. McJohnson, 91 Drew Ave., Houston 6, Tex.
Filed Dec. 21, 1962, Ser. No. 246,520
5 Claims. (Cl. 137—636.1)

The present invention relates to valves generally and in particular to a spout type of mixing valve for a lavatory, shower, or the like.

An object of the present invention is to provide a mixing valve of the spout type which is controlled by swinging the spout to the left or the right.

Another object of the present invention is to provide a mixing valve which is controlled by the spout thereof with the spout moving to the left or right and having a shut-off position at the extreme right and at the extreme left.

A further object of the present invention is to provide a spout type of faucet for a sink or shower head which is assembled with a single fastening element, the fastening element also serving as a means for tightening the unit against leakage.

A still further object of the present invention is to provide a faucet type of mixing valve in which there are no washers to wear out, one which may be manufactured in quantity at reasonable cost, one which is sturdy in construction and of simple structure, and one which is highly effective in action.

Figure 1:
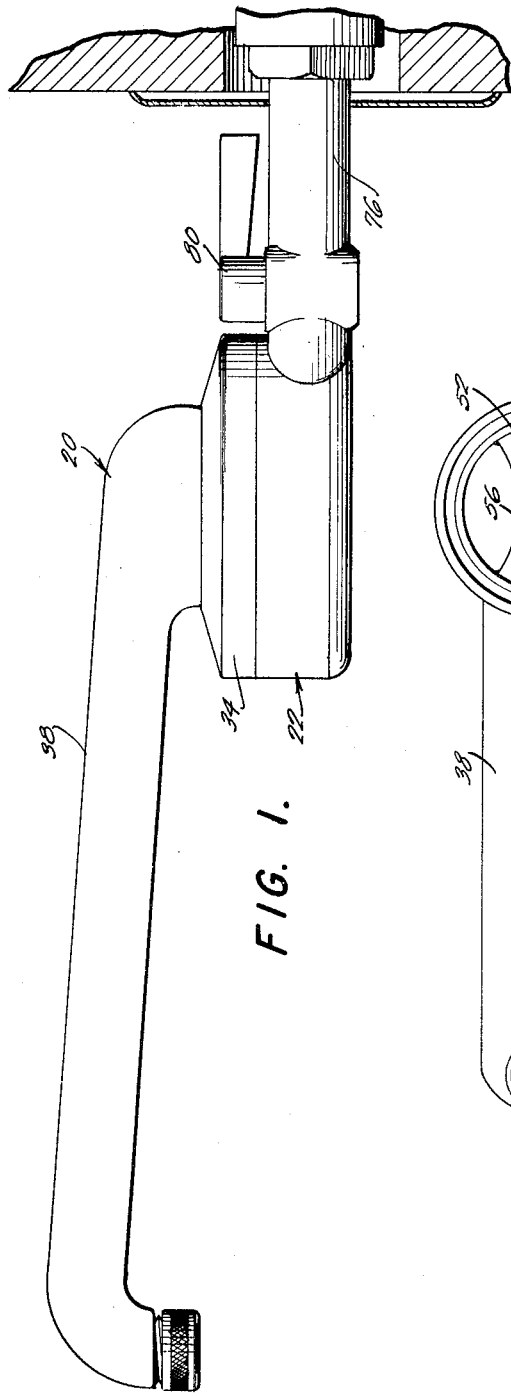
Figure 9:
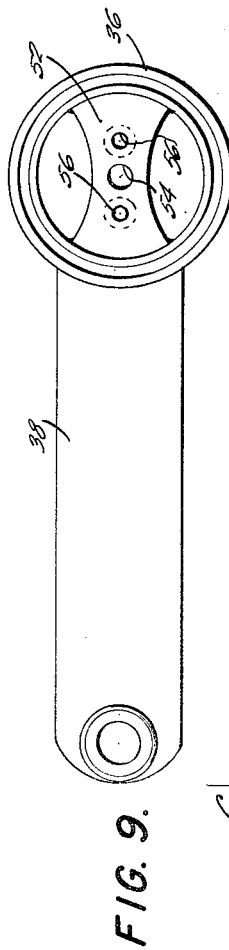
Figure 2:
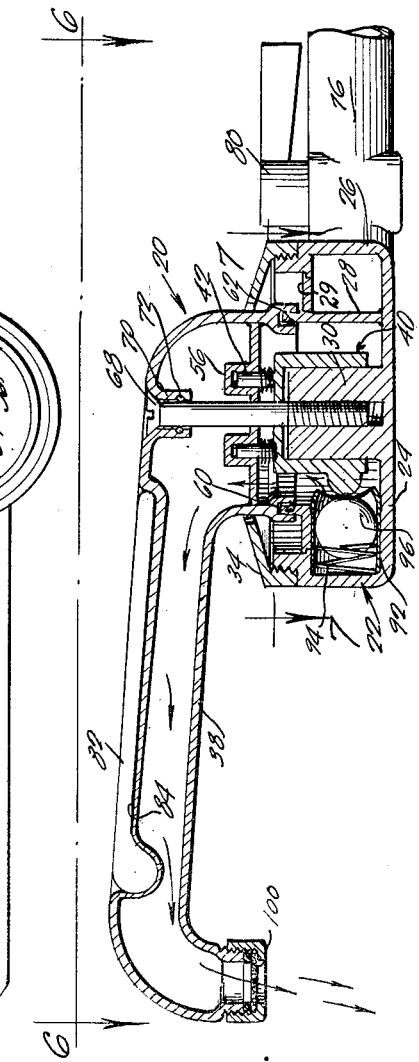

These and other objects and advantages of the invention will be fully apparent from the following description when taken in connection with the annexed drawings, in which:

FIGURE 1 is a side elevational view of the mixing valve of the present invention, shown projecting from a wall surface, FIGURE 2 is a sectional view of the assembly shown in FIGURE 1, FIGURE 3 is an exploded view partially in section, FIGURE 4 is a plan view partially in section showing hot and cold water being mixed, FIGURE 5 is a view similar to FIGURE 4 showing the valve in off position, FIGURE 6 is a view taken on the line 6—6 of FIGURE 2, FIGURE 7 is a view taken on the line 7—7 of FIGURE 2, FIGURE 8 is a view taken on the line 8—8 of FIGURE 6, FIGURE 9 is a view taken on the line 9—9 of FIGURE 3, FIGURE 10 is a view taken on the line 10—10 of FIGURE 3, FIGURE 11 is a fragmentary view in elevation showing another type of nozzle for attachment to the outlet end of the spout, and FIGURE 12 is a view taken on the line 12—12 of FIGURE 11.

Referring to the drawings in detail, in which like numerals indicate like parts throughout the several views, the mixing valve or spout faucet of the present invention is designated generally by the reference numeral 20 and it consists in a horizontally disposed body 22 having a bottom 24 and a circular outer wall rising from the perimeter of the bottom 24, as at 26, in FIGURES 2 and 3.

An inner wall 28 rises from the bottom 24 and is spaced from the outer wall 26. A top wall 29 extends between the inner wall 28 and outer wall 26 to form a closure for the space therebetween. A post 30 rises from the bottom 24, the post 30 and the inner wall 28 being concentrically arranged with respect to the outer wall 26.

The outer wall 26 is provided with a threaded offset upper end portion 32 which receives thereon an annular cap 34, the open center of the cap 34 being of a size to receive therein the inlet portion 36 of a spout member 38.

An inverted cup shaped element 40 is provided and the element 40 is slidable and rotatable on the post 30.

A pair of spaced projections 42 project upwardly from the bottom 44 of the element 40 and centrally of the bottom 44 is a hole 46.

Exteriorly of the side wall 48 of the element 40 are three cams 50 arranged in axial alignment and spaced from each other.

Inwardly of the open inlet end 36 there is a web 52 having a central opening 54 and a pair of upwardly extending sockets 56.

The sprockets 56 receive the projection 42 and springs 58 bias the spout member 38 upwardly relative to the element 40.

The wall of the spout member 38 adjacent the inlet is provided with a groove 60 which receives the upper end portion of the inner wall 28 when the spout member is in the assembled position shown in FIGURE 2.

An O-ring 62 is received in a groove 64 provided in the inner face of the wall 28.

The post 30 is provided with a vertically disposed threaded bore 66 which receives the threaded end portion of a bolt 68 extending through an inwardly directed hollow boss 70 in the spout member 38. The bolt 68 also extends through the opening 54 is the web 52 and through the hole 46 in the bottom 44 of the cap element 40. Another O-ring 72 seated in a groove provided in the inner wall of the boss 70 seals the bolt 68 when it is in the assembled position.

Conduit means is provided for the body 22 for admitting hot and cot water into the chamber formed by the outer wall 26 and inner wall 28.

These conduits are shown at 74 and 76 in FIGURES 4 and 5.

Each of the conduits 74 and 76 is provided with a valve 78, 80, respectively, by means of which hot or cold water may be selectively admitted through the faucet 20 of the present invention.

An important feature of the present invention is the provision of a thermometer 82 received in a recess 84 provided in the upper portion of the spout member 38.

The upper surface of the cap 34 is provided with indicia, as at 86 in FIGURE 10 indicating the proper position of the spout for receiving therethrough either cold water, hot water, or cold and hot water in a mixture.

Valve means is provided in ports 88 and 90 which extend through the inner wall 28. This valve means consists in a casing element 92 containing a spring 94 and a ball 96. The casing is provided with an opening 98 in the side thereof and the end of the casing adjacent the ball 96 tapers inwardly so as to form a valve seat for the ball 96. Each of the balls 96 are in the path of movement of the cams 50 when the spout member 38 is rotated about the bolt 68 as an axis.

The outlet end of the spout member 38 may be provided with an aerator filter element 100 or with a sprinker type of head 102 as in FIGURES 11 and 12.

As will be understood from an examination of FIGURE 4, when the spout member 38 is in the central position both of the balls 96 are engaged by the end cams 50 and are moved off of their respective valve seats so as to admit hot and cold water in a mixture into the space between the element 40 and the inner wall 28. When the spout is swung all the way to the left or to the right the balls 96 are disengaged by the cams 50 and the water ceases to flow. Upon moving the spout member 38 from the right hand extreme position shown in dotted lines in FIGURE 5 the middle cam 50 will engage the adjacent ball 96 and open that valve to admit cold water. Upon further movement of the spout the end cam 50 will approach the other ball 96 and will move that ball off of its seat to admit hot water.

The same action takes place but in reverse when the valve is moved from the extreme left hand position, first the hot water being opened and then the cold water being opened and then with the valve in the central position of FIGURE 4 both the hot and cold water valves will be opened.

It will be seen therefore that the device of the present invention may be employed to provide a shower head or a faucet for a sink or lavatory as desired and that by merely swinging the spout from one position to another the control of the water and the temperature thereof may be varied to suit the person employing the same.

While only a preferred embodiment of the present invention has been shown and described, other embodiments are contemplated and numerous changes and modifications may be made in the invention without departing from the spirit thereof as set forth in the appended claims.

What is claimed is:

1. A valve comprising a horizontally disposed body having a bottom, an outer circular wall rising from the perimeter of said bottom, an inner circular wall rising from said bottom concentrically of and spaced from said outer wall, an annular top wall extending between the inner wall and outer wall in spaced relation to the bottom, a post arranged concentrically of and spaced from said inner wall and rising from said bottom, an inverted cup-shaped element slidably and rotatably mounted on said post, a cam disposed exteriorly of and carried by the wall of said element, an elongated spout member having an inlet at one end and an outlet at the other end, said member being positioned with the inlet rotatably mounted on the portion of said inner wall adjacent the upper end thereof, means connecting said element to said member for rotation therewith, there being a port in said inner wall, an openable and closable cam-operable valve in said port in the path of movement of said cam, and conduit means having one end connected in communication with the space between said inner and outer walls.

2. A valve comprising a horizontally disposed body having a bottom, an outer circular wall rising from the perimeter of said bottom, an inner circular wall rising from said bottom concentrically of and spaced from said outer wall, an annular top wall extending between the inner wall and outer wall in spaced relation to the bottom, a post arranged concentrically of and spaced from said inner wall and rising from said bottom, and inverted cup shaped element slidably and rotably mounted on said post, a cam disposed exteriorly of and carried by the wall of said element, an elongated spout member having an inlet at one end and an outlet at the other end, said member being positioned with the inlet rotatably mounted on the portion of said inner wall adjacent the upper end thereof, means connecting said element to said member for rotation therewith, there being a pair of ports in said inner wall, said ports being in spaced relation, an openable and closable cam-operable valve in each of said ports each being in the path of movement of said cam, and conduit means having one end connected in communication with the space between said inner and outer walls.

3. A valve comprising a horizontally disposed body having a bottom, an outer circular wall rising from the perimeter of said bottom, an inner circular wall rising from said bottom concentrically of and spaced from said outer wall, an annular top wall extending between the inner wall and outer wall in spaced relation to the bottom, a post arranged concentrically of and spaced from said inner wall and rising from said bottom, an inverted cup shaped element slidably and rotatably mounted on said post, first, second and third cams arranged in circumferentially aligned spaced relation exteriorly of and carried by the wall of said element, an elongated spout member having an inlet at one end and an outlet at the other end, said member being positioned with the inlet rotatably mounted on the portion of said inner wall adjacent the upper end thereof, means connecting said element to said member for rotation therewith, there being a pair of ports in said inner wall, said ports being in spaced relation, an openable and closable cam-operable valve in each of said ports each being in the path of movement of said first, second, and third cams, and conduit means having one end connected in communication with the space between said inner and outer walls.

4. A valve comprising a horizontally disposed body having a bottom, an outer circular wall rising from the perimeter of said bottom, an inner circular wall rising from said bottom concentrically of and spaced from said outer wall, a post arranged concentrically of and spaced from said inner wall and rising from said bottom, a portion of the upper end of said outer wall being threaded, an annular cap threadably engaged on said outer wall portion, and inverted cup shaped element slidably and rotatably mounted on said post, a cam disposed exteriorly of and carried by the wall of said element, an elongated spout member having an inlet at one end and an outlet at the other end, said member being positioned with the inlet rotatably mounted on the portion of said inner wall adjacent the upper end thereof, the portion of said spout member adjacent said inlet extending through said cap, means connecting said element to said member for rotation therewith, there being a port in said inner wall, an openable and closable cam-operable valve in said port in the path of movement of said cam, and conduit means having one end connected in communciation with the space between said inner and outer walls.

5. A valve comprising a horizontally disposed body having a bottom, an outer circular wall rising from the perimeter of said bottom, an inner circular wall rising from said bottom concentrically of and spaced from said outer wall, a post arranged concentrically of and spaced from said inner wall and rising from said bottom, a portion of the upper end of said outer wall being threaded, an annular cap threadably engaged on said outer wall portion, an inverted cup shaped element slidably and rotatably mounted on said post, a cam disposed exteriorly of and carried by the wall of said element, an elongated spout member having an inlet at one end and an outlet at the other end, said member being positioned with the inlet rotatably mounted on the portion of said inner wall adjacent the upper end thereof, the portion of said spout member adjacent said inlet extending through said cap, means connecting said element to said member for rotation therewith, there being a port in said inner wall, an openable and closable cam-operable valve in said port in the path of movement of said cam, conduit means having one end connected in communication with the space between said inner and outer walls, and sealing means carried by said inner wall upper end portion engaging said spout member.

References Cited in the file of this patent
UNITED STATES PATENTS

| | | |
|---|---|---|
| 253,155 | Butler | Jan. 31, 1882 |
| 759,246 | Delany | May 10, 1904 |
| 1,293,003 | Bergens | Feb. 4, 1919 |
| 2,452,295 | Elliot | Oct. 26, 1948 |
| 2,573,716 | Kirtley | Nov. 6, 1951 |
| 2,576,414 | Peterson | Nov. 27, 1951 |